A. COCKRELL.
FEEDING PULVERIZED FUEL TO FURNACES.
No. 180,550. Patented Aug. 1, 1876.
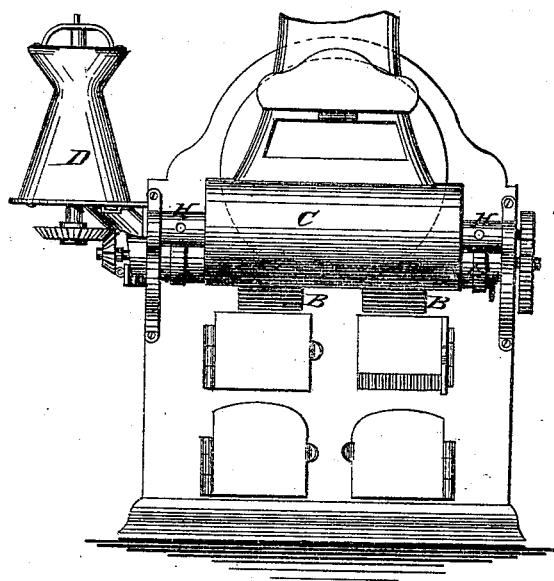
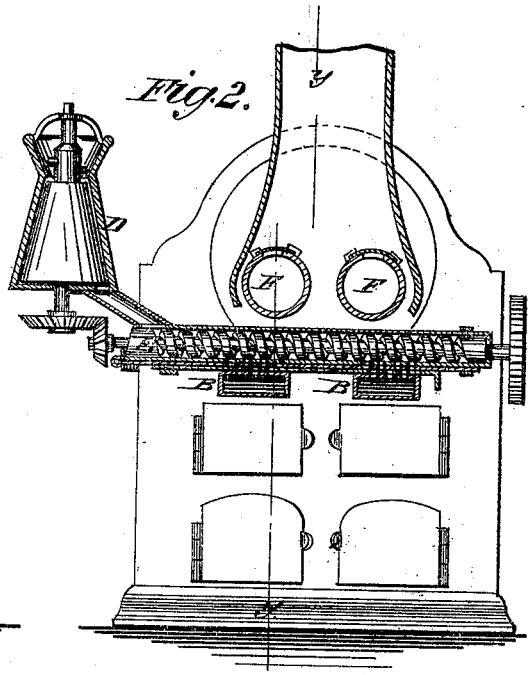
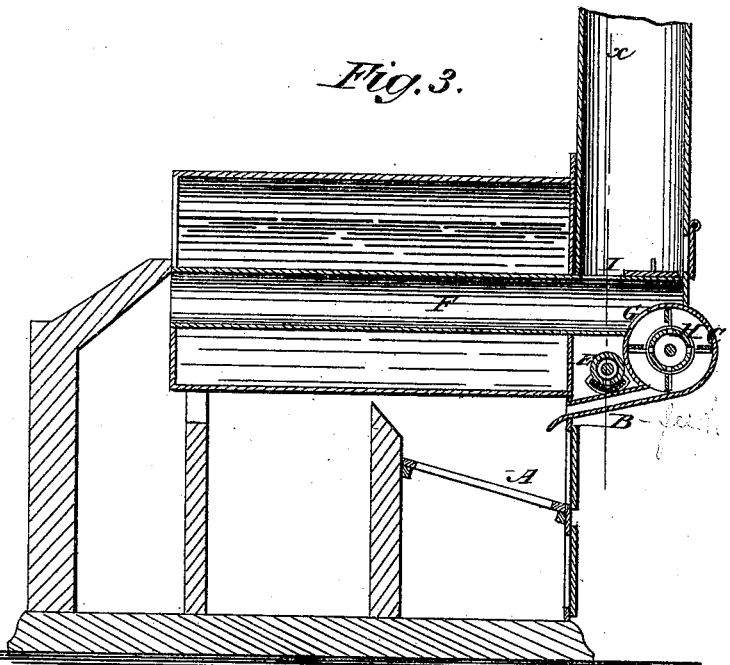
WITNESSES:
Francis McArdle,
John Goethals
INVENTOR:
A. Cockrell
BY
ATTORNEYS.

UNITED STATES PATENT OFFICE.

ALLIN COCKRELL, OF LAMAR, MISSOURI.

IMPROVEMENT IN FEEDING PULVERIZED FUEL TO FURNACES.

Specification forming part of Letters Patent No. 180,550, dated August 1, 1876; application filed March 6, 1876.

*To all whom it may concern:*

Be it known that I, ALLIN COCKRELL, of Lamar, in the county of Barton and State of Missouri, have invented a new and Improved Fuel-Feeding Apparatus for Furnaces, of which the following is a specification:

My invention consists of a fan-blower combined with a furnace in such manner as to feed it with a constant and regular supply of fuel, and having a conveyer for supplying the fuel to it from a mill in which it is ground, or from a feeding-hopper to be supplied with previously-pulverized fuel, as culm, tan-bark, sawdust, and the like.

Figure 1 is a front elevation of a furnace with my improved feeding attachment. Fig. 2 is a sectional elevation taken on line *x x* of Fig. 3; and Fig. 3 is a longitudinal sectional elevation.

Similar letters of reference indicate corresponding parts.

A is the furnace; B, feeding-spouts; C, a fan for blowing the fuel into the furnace; E, a conveyer for supplying the fuel to the feeding-spout B; and D, a mill for grinding the fuel and delivering it into the conveyer; but the fuel may be supplied to the conveyer from a feeding-hopper in case of burning culm, tan-bark and other previously-prepared fuel.

The fan is also contrived to return the hot air and gases from the flue F into the furnace through passage G and spouts B, and, in order that it may not heat too much, the shaft H is made hollow to take in the cool air through it. The quantity of returns from flue F to the furnace will be regulated by damper I. The fan-blast and the feed-supply will also be regulated, as required, by suitable valves, dampers, or gates.

Having thus described my invention, I claim as new and desire to secure by Letters Patent—

The combination of a pulverizing-mill, D, and furnace A, the former provided with a conveyer and the latter with a fan having spout, all constructed and arranged substantially as and for the purpose specified.

ALLIN COCKRELL.

Witnesses:
 WILLIAM HARVEY CRUZAN,
 WM. C. GRIER.